United States Patent
Zhang et al.

(10) Patent No.: US 10,356,716 B2
(45) Date of Patent: Jul. 16, 2019

(54) METHOD AND NETWORK ELEMENT FOR SCHEDULING A COMMUNICATION DEVICE

(71) Applicant: Telefonaktiebolaget LM Ericsson (publ), Stockholm (SE)

(72) Inventors: Jianwei Zhang, Solna (SE); Ying Sun, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 226 days.

(21) Appl. No.: 15/325,990

(22) PCT Filed: Jul. 17, 2014

(86) PCT No.: PCT/SE2014/050898
§ 371 (c)(1),
(2) Date: Jan. 12, 2017

(87) PCT Pub. No.: WO2016/010467
PCT Pub. Date: Jan. 21, 2016

(65) Prior Publication Data
US 2017/0164282 A1    Jun. 8, 2017

Related U.S. Application Data

(63) Continuation of application No. PCT/SE2014/050898, filed on Jul. 17, 2014.

(51) Int. Cl.
*H04W 52/02* (2009.01)
*H04W 72/12* (2009.01)
*H04L 5/00* (2006.01)

(52) U.S. Cl.
CPC ....... *H04W 52/0216* (2013.01); *H04L 5/0032* (2013.01); *H04W 72/1231* (2013.01);
(Continued)

(58) Field of Classification Search
None
See application file for complete search history.

(56) References Cited

U.S. PATENT DOCUMENTS 6,816,492 B1 *  11/2004  Turner .............. H04L 49/1515
                                                    370/394
6,879,561 B1 *   4/2005  Zhang ................ H04L 1/0017
                                                    370/235
(Continued)

FOREIGN PATENT DOCUMENTS

CN    1551653 A    12/2004
CN    1938992 A     3/2007
(Continued)

OTHER PUBLICATIONS

International Search Report, Application No. PCT/SE2014/050898, dated Mar. 18, 2015.
(Continued)

*Primary Examiner* — Chi H Pham
*Assistant Examiner* — Vladislav Y Agureyev
(74) *Attorney, Agent, or Firm* — Sage Patent Group (57) ABSTRACT

A method performed in a network element provides for scheduling a communication device of a wireless network. The method comprises: estimating a scheduling metric of a first arrived packet at a future time instant t, taking into account time domain restrictions for the communication device that restricts a future scheduling occasion; determining whether the estimated scheduling metric at the future time instant t is within limits of the scheduling metric; calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and scheduling the com-
(Continued)

munication device according to determined scheduling weight. The disclosure also relates to a corresponding network element, computer program and computer program product.

19 Claims, 5 Drawing Sheets

(52) U.S. Cl.
CPC .... *H04W 72/1236* (2013.01); *H04W 72/1221* (2013.01); *H04W 72/1247* (2013.01); *Y02D 70/1262* (2018.01); *Y02D 70/23* (2018.01); *Y02D 70/24* (2018.01)

(56) References Cited

U.S. PATENT DOCUMENTS

| | | | | |
|---|---|---|---|---|
| 7,061,927 | B2 | 6/2006 | Panigrahy | |
| 2003/0140162 | A1* | 7/2003 | Penet | H04L 47/10 709/232 |
| 2003/0165148 | A1 | 9/2003 | Bishard | |
| 2004/0052259 | A1* | 3/2004 | Garcia | H04L 43/00 370/392 |
| 2004/0223505 | A1 | 11/2004 | Kim | |
| 2006/0268713 | A1* | 11/2006 | Lundstrom | H04L 47/10 370/235 |
| 2007/0019552 | A1* | 1/2007 | Senarath | H04L 47/10 370/235 |
| 2007/0053331 | A1* | 3/2007 | Kolding | H04W 72/1236 370/338 |
| 2008/0008203 | A1* | 1/2008 | Frankkila | H04L 47/2416 370/412 |
| 2009/0147731 | A1* | 6/2009 | Chion | H04L 47/10 370/328 |
| 2010/0113023 | A1* | 5/2010 | Huang | H04W 52/0216 455/436 |
| 2012/0052814 | A1* | 3/2012 | Gerber | H04W 76/38 455/67.11 |
| 2012/0281536 | A1* | 11/2012 | Gell | H04W 28/06 370/235 |
| 2012/0327803 | A1* | 12/2012 | Lee | H04W 72/1221 370/252 |
| 2013/0155852 | A1* | 6/2013 | Paredes | H04W 28/16 370/230 |
| 2014/0073368 | A1* | 3/2014 | Teyeb | H04W 72/0426 455/501 |
| 2014/0119214 | A1* | 5/2014 | Jeon | H04L 43/50 370/252 |
| 2014/0281034 | A1* | 9/2014 | Callard | H04L 29/0604 709/247 |
| 2014/0295865 | A1* | 10/2014 | Fantaye | H04W 72/1226 455/450 |
| 2014/0362830 | A1* | 12/2014 | Verger | H04W 36/0072 370/332 |
| 2015/0222549 | A1* | 8/2015 | Kakadia | H04L 47/18 370/231 |
| 2015/0351028 | A1* | 12/2015 | Vallath | H04W 52/0209 370/311 |
| 2015/0381463 | A1* | 12/2015 | Bontu | H04W 72/005 370/252 |
| 2016/0044133 | A1* | 2/2016 | Gibbon | H04L 67/325 709/219 |

FOREIGN PATENT DOCUMENTS

| | | |
|---|---|---|
| CN | 102523559 A | 6/2012 |
| CN | 103259743 A | 6/2012 |
| EP | 1 443 719 A1 | 8/2004 |
| EP | 2 381 730 A1 | 10/2011 |
| GB | 2 503 509 A | 1/2014 |
| WO | WO 2007/017753 A1 | 2/2007 |
| WO | WO 2013/190364 A2 | 12/2013 |

OTHER PUBLICATIONS

Written Opinion of the International Searching Authority, Application No. PCT/SE2014/050898, dated Mar. 18, 2015.
Chinese Office Action dated Mar. 11, 2019 for Chinese Patent Application No. 2014800806529, 3 pages.

* cited by examiner

METHOD AND NETWORK ELEMENT FOR SCHEDULING A COMMUNICATION DEVICE

CROSS REFERENCE TO RELATED APPLICATION

This application is a 35 U.S.C. § 371 national stage application of PCT International Application No. PCT/SE2014/050898, filed on Jul. 17, 2014, the disclosure and content of which is incorporated by reference herein in its entirety. The above-referenced PCT International Application was published in the English language as International Publication No. WO 2016/010467 A1 on Jan. 21, 2016.

TECHNICAL FIELD

The technology disclosed herein relates generally to the field of wireless networks, and in particular to resource scheduling in wireless networks.

BACKGROUND

Scheduling comprises assigning a communication resource to a particular communication device (denoted user equipment, UE, in the following) at a given time interval. The scheduling can be done in accordance with different packet scheduling schemes. For instance, a scheduler implementing a delay based scheduling (DBS) tries to maintain given delay thresholds for traffic flows by minimizing their packet queuing delay. A scheduler implementing a proportional fair may aim at providing a guaranteed data rate for the traffic flows.

Real-time applications, such as Voice over Internet Protocol (VoIP) and video telephony, have strict delay constraints and require that the packets are sent within a certain delay budget for keeping user satisfaction. Delay based scheduling used for conversational type of traffic such as Voice over Internet Protocol (VoIP) applications or conversational video bundles together multiple packets within a packet delay budget to one transmission in order to save resources (e.g. Physical Downlink Control Channel, PDCCH, resources in case of Long Term Evolution, LTE). For a mixed traffic scenario, comprising both delay critical traffic and delay tolerant traffic, an improved throughput for best effort traffic is thereby achieved without compromising the Quality of Service (QoS) of e.g. VoIP/conversational video applications.

A number of packets are thus bundled together before transmission. In delay based scheduling, for instance, a fixed packet bundling time is used to decide when to schedule a particular UE, and the packet delay budget stipulates for how long the oldest packet of a packet bundle can be held before transmission without the QoS being compromised. When the packet is older than the packet bundling time, the corresponding UE is scheduled with absolutely highest priority in order to meet the QoS requirement. This is done by adding an extra scheduling weight bonus (weight boost) on the scheduling weight of the packet bundle, thus giving the packet a higher priority.

In minimum bit rate proportional fair, the scheduling weight is computed based on instantaneous rate, which is a data rate that the UE could potentially get, and based on an average rate for the UE.

Within wireless networks, there are time domain restrictions that may be introduced for various purposes. The communication devices may for example be configured to use a discontinuous reception (DRX) mode in order to reduce energy consumption. Besides DRX, such time domain restrictions can be introduced by features/schemes such as for instance Almost Blank Subframe (ABS) and in enhanced Inter-Cell Interference Coordination (eICIC) schemes. These features are all valuable, e.g. saving energy of the limited energy source in the case of DRX and reducing interference in the case of eICIC, but such features may also pose difficulties in view of scheduling.

SUMMARY

Taking the DRX as an example; in DRX a DRX cycle is used which comprises an "On Duration" during which the UE should monitor downlink channels and a "DRX sleep period" during which the UE does not receive downlink channels. The UE saves energy by turning off circuitry during the inactive DRX sleep periods. If the UE is in a DRX sleep period at a scheduled time then the bundled packet transmission is not allowed and a new scheduling time is determined. At this new scheduling time, the oldest packet may be older than the packet delay budget and therefore be lost. This problem could be overcome by adjusting the DRX cycle of the UE in view of the scheduling, but this would entail increased signaling in the network in reconfiguration of the UEs. Further, the UE would be in DRX sleep mode for a shorter period of time, which is disadvantageous in view of its battery consumption.

A minimum bit rate proportional fair scheduling may also encounter packet losses due to such future time restrictions. In particular, it may not be possible to guarantee a minimum bit rate for a UE being in a DRX sleep period.

The time restrictions posed by these features at a future time instance might thus cause packet losses when performing scheduling.

An object of the present disclosure is to solve or at least alleviate at least one of the above mentioned problems.

The object is according to a first aspect achieved by a method performed in a network element for scheduling a communication device of a wireless network. The method comprises estimating a scheduling metric of a first arrived packet at a future time instant t, taking into account time domain restrictions for the communication device that restricts a future scheduling occasion; determining whether the estimated scheduling metric at the future time instant t is within limits of the scheduling metric; calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and scheduling the communication device according to determined scheduling weight.

The method enables improved service quality, e.g. in terms of reduced packet losses. The service quality can be improved without adding overhead to the battery consumption of the communication device. The method may automatically adapt packet, arrival time in view of e.g. a discontinuous reception mode and decide whether to bundle the packets or send them without bundling, while maintaining required quality of service for the communication device.

The object is according to a second aspect achieved by a network element for scheduling a communication device in a wireless network. The network element is configured to: estimate a scheduling metric of a first arrived packet at a future time instant, taking into account time domain restrictions for the communication device that restricts a future scheduling occasion; determine whether the estimated scheduling metric at the future time instant t is within limits of the scheduling metric; calculate, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and schedule the communication device according to determined scheduling weight.

The object is according to a third aspect achieved by a computer program for a network element for scheduling a communication device, the computer program comprising computer program code, which, when executed on a processor of the network element causes the network element to perform the method as above.

The object is according to a fourth aspect achieved by a computer program product comprising a computer program as above, and a computer readable means on which the computer program is stored.

The object is according to a fifth aspect achieved by network element comprising first means for estimating a scheduling metric of a first arrived packet at a future time instant, taking into account time domain restrictions for the communication device that restricts a future scheduling occasion; means for determining whether the estimated scheduling metric at the future time instant is within limits of the scheduling metric, means for calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and means for scheduling the communication device according to determined scheduling weight.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In the following, the shortcoming mentioned briefly under the Summary section is elaborated on.

In delay based scheduling, a fixed packet bundling time is used for awaiting and bundling a number of packets. The packet bundling time is used to decide when to schedule a particular UE. When the QoS requirement of a packet of the packet bundle is about to be violated, i.e. when the age of the oldest packet is longer than packet bundling time, the UE will be scheduled with the absolutely highest priority. This is done by adding an extra scheduling weight bonus (weight boost) on the scheduling weight of the packet bundle, thereby giving the packets a higher priority.

Figure 1:
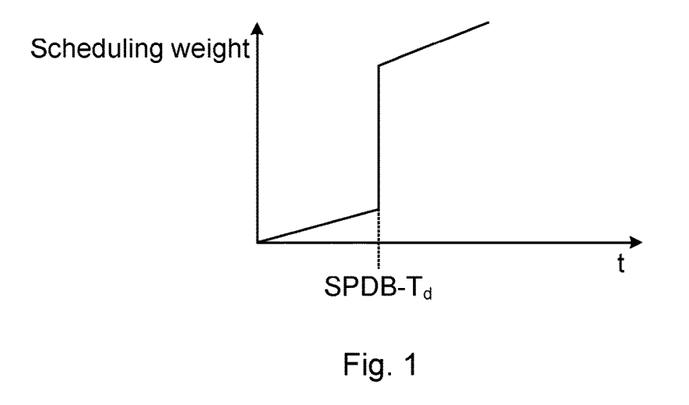
FIG. 1 illustrates a delay based scheduling function.

The above indicated weight function of delay based scheduling (DBS) is illustrated in FIG. 1. In particular, the scheduling weight (y-axis) for a bundle of packets is shown as function of time (x-axis). In the beginning, the bundle of packets, comprising e.g. VoIP-packets, can have a rather low scheduling weight, which increases slowly until a limit is reached, upon which the bundle of packets is scheduled immediately.

For example, VoIP TALK packets are sent with 20 ms period (i.e. one packet every 20 ms), and the TALK quality is considered to be good when a packet delay is smaller than certain time, e.g. 40 ms, which may be denoted VoIP delay tolerance limit. Based on that delay tolerance limit a scheduler packet delay budget (SPDB) is estimated and applied to a DBS weight algorithm in the scheduling.

The scheduling weight corresponds to the scheduling priority, and the UE's scheduling weight thus gets boosted, as described above, if the age of a packet bundle comprising a fixed number of packets is larger than the difference SPDB−Td, where Td is the expected transmission delay of a packet bundle counted from the time of the transmission thereof being scheduled to the time of the transmission being successfully received. That is:

$$\text{Age of packet bundle}=t\_current-t\_oldest$$

, wherein t_current stands for the point of time at which the scheduling weight was calculated for the UE, and t_oldest stands for the point of time when the first VoIP-packet of the packet bundle got identified in the scheduler.

If t_current>SPDB−Td+t_oldest, the scheduling weight is boosted by adding a weight bonus on the scheduling weight. This may for instance be done according to:

$$F=t\_current>(SPDB-Td+t\_oldest)?1:0$$

$$W=Age*W_{DBS}+F*W\_bonus;$$

That is, if t_current>(SPDB−Td+t_oldest) is true, the F=1, else F=0. Then a bonus weight W_bonus is added to the scheduling weight W accordingly, by multiplying it with 1 or 0.

The current scheduling scheme fails to consider e.g. the DRX impact to the delay sensitive packet. The DRX pattern of a UE is fixed, i.e. configured by Radio Resource Control (RRC) signaling, telling the UE when to enter sleep mode and when to be monitoring downlink channels.

VoIP packet is semi-static in that when the first packet arrives the consecutive packets arrive every 20 ms, but it is unknown when the first VoIP packet arrives. Bundling of the fixed number of VoIP packets without considering the configured DRX pattern of the UE will cause packet loss and QoS is sacrificed. In the DRX cycle that is configured for the UE, an active period denoted On Duration is configured during which the UE is active and monitors downlink channels. The remaining time of the DRX cycle, the UE can be inactive and turn off circuitry, thus saving battery.

Figure 2:
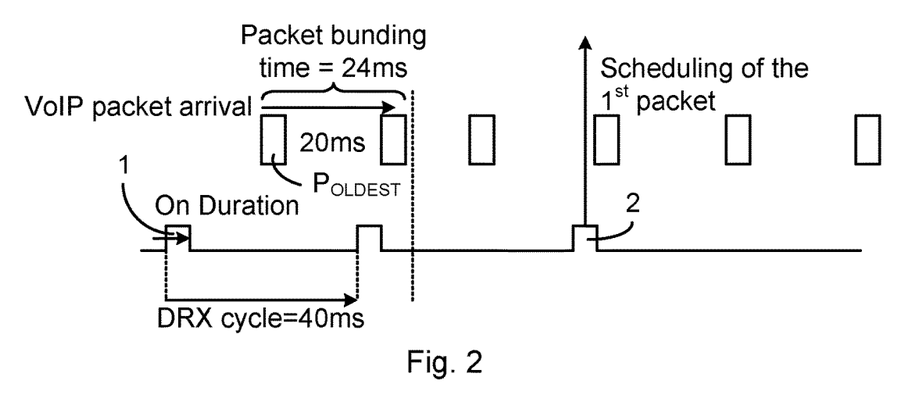
FIG. 2 illustrates a difficulty when using a delay based scheduling function.

FIG. 2 illustrates an exemplary scenario wherein the above mentioned problem occurs. In this scenario, the oldest VoIP packet $P_{OLDEST}$ of a packet bundle arrives after the DRX OnDuration window, indicated at reference numeral 1, of the UE and since the age of the packet has not reached the delay tolerance limit it gets a low scheduling weight. The UE is not allowed to be scheduled during its DRX sleep period and hence the next transmission opportunity will be inside the next On Duration window, indicated at reference numeral 2. This means that the length of one DRX cycle will be added to the delay of the oldest VoIP packet $P_{OLDEST}$, resulting in that the VoIP delay tolerance limit is exceeded and the packet $P_{OLDEST}$ will be lost.

This is a problem which may happen if there are any time domain restrictions introduced for any purpose. Besides DRX, and as mentioned earlier, such restriction may be introduced by features/schemes such as for instance Almost Blank Subframe (ABS) and in in enhanced Inter-Cell Interference Coordination (eICIC) schemes.

A problem of the current delay based scheduling as identified by the inventors of the present disclosure is that the delay budget SPDB is based on the current time $t_{current}$ when the scheduling is performed and not on a future time instance when the bundled transmission is performed. Without taking into account possible time restrictions at the future time instance, the delay based scheduling might cause packet losses as is evident e.g. from the situation described with reference to FIG. 2. At the future time instance, the UE might be in DRX sleep or there might be ABS restrictions, and the bundled packet transmission is not allowed whereby the oldest packet is lost.

Other scheduling schemes besides the delay based scheduling also encounter difficulties due to such future time restrictions. In the minimum bit rate proportional fair scheduling for instance, such restrictions may lead to that a minimum bit rate cannot be guaranteed for a UE being in a DRX sleep period. This is described a bit more in the following.

In minimum bit rate proportional fair, the scheduling weight W is computed based on $$W = \frac{R_{instant}^{\alpha}}{R_{avg}},$$

wherein $R_{ins\ tan\ t}^{\alpha}$ is the instantaneous rate, e.g. bit rate, that the UE could currently get based on radio conditions estimated at the current time, α is a fraction of proportional fair ratio, and $R_{avg}$ is the average rate of the UE at the current time. A minimum bit rate may be defined by an operator and be based on QoS requirement of the application and QoS Class Identifier (QCI). If the average rate $R_{avg}$ is lower than the minimum bit rate, the UE will get a very high scheduling weight W so that the UE is scheduled immediately to fulfill the QoS requirement.

However, if the DRX sleep period is long, it may not be possible to guarantee minimum bit rate anymore. The average bit rate $R_{avg}$ is computed at the current time and if the average bit rate at this time is larger than the minimum bit rate and if the UE is in bad radio condition, the UE will get low scheduling weight W according to the minimum bit rate proportional fair scheduling and will hence not be scheduled. The UE then waits for the next DRX on duration to transmit and the average bit rate will be much lower than the minimum bit rate. To schedule the UE at that time will make it impossible to fulfill the QoS requirement.

It is important to satisfy quality of service (QoS) requirements, whether it is in terms of keeping a delay budget or guaranteeing a received data rate, while at the same time allowing time constraints such as DRX or eICIC in order to reduce power consumption or reduce interference.

Briefly, in order to overcome the above problems, a scheduling is provided wherein knowledge about time domain restrictions introduced by different features, for example DRX, is used in the scheduling. It is predicted if transmission is possible at the transmit time of the bundled packets based on this knowledge. Depending on a predicted packet delay at future time instance, a scheduling weight is calculated, e.g. using the delay based scheduling weight function or minimum bit rate proportional fair scheduling. In case there is a time restriction in the future, the oldest packet might be transmitted without bundling. Thereby packet losses are reduced. The quality for these delay critical services can be improved by the present algorithm that involves for instance DRX cycle knowledge to calculate a UE scheduling priority.

In an embodiment, described next, DRX is used as the time restriction, restricting the possible scheduling occasions for the UE. Further, the concept of the present disclosure of introducing time restrictions in the packet scheduling is described in relation to and exemplified by delay based scheduling. It is however noted that other scheduling schemes may be used, e.g. proportional fair scheduling with a guaranteed minimum bit rate, and that the time restriction could be other than DRX.

It is assumed that packets can be identified as being either delay critical or delay non-critical. Such identification may for instance be made by identifying the packet as delay critical based on QoS class identifier in a packet header or other priority indicator. The length of DRX cycle, $T_{DRX}$, is introduced in the scheduling algorithm when handling delay critical packets. An embodiment of an algorithm 20 according to the present disclosure is described with reference to FIG. 3.

Figure 3:
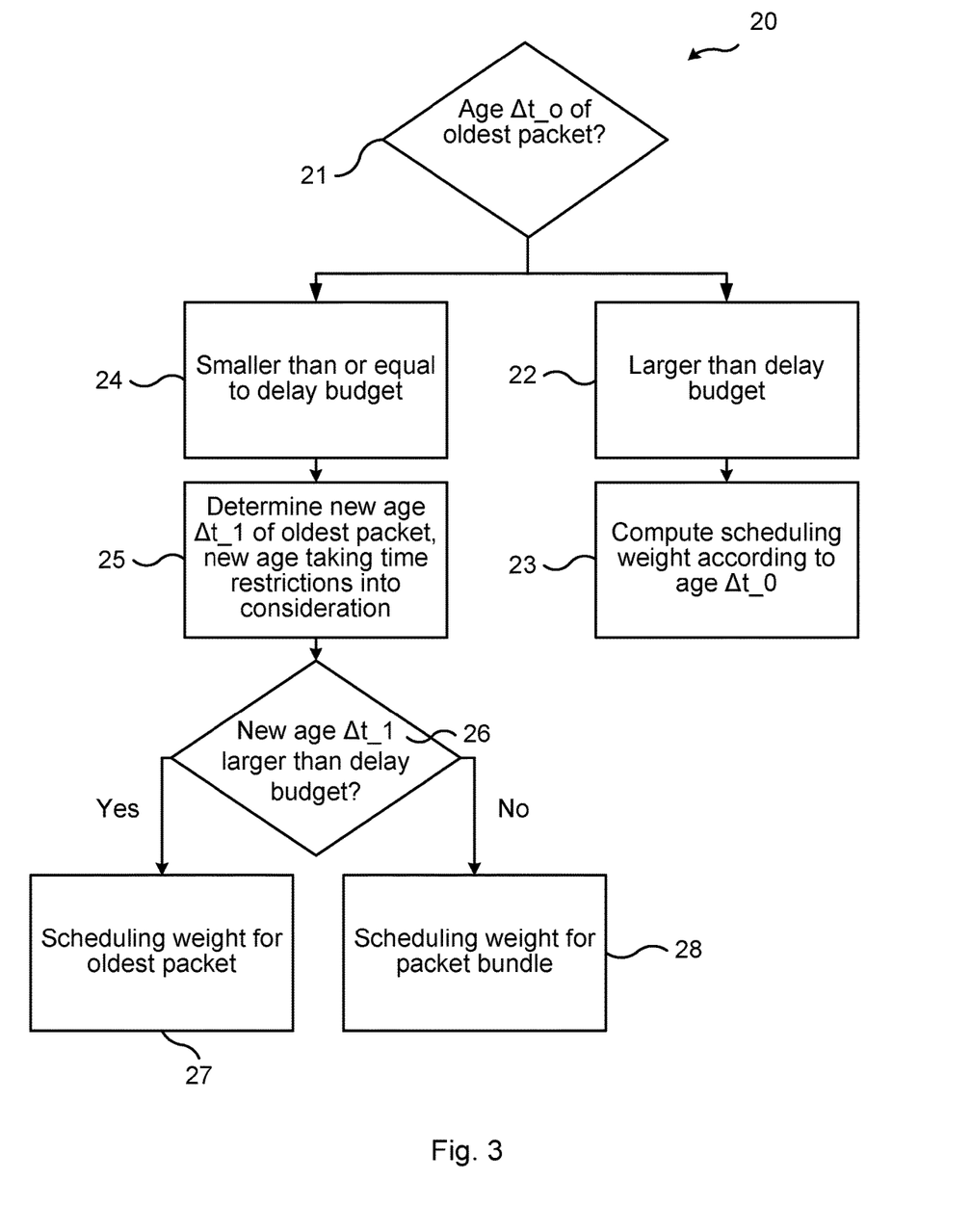
FIG. 3 is a flow chart of a scheduling algorithm according to an embodiment of the present disclosure.

First, the age of the oldest packet at the current time t_current is computed, box 21.

The age Δt_0 of the oldest packet is defined as:

Δt_0=t_current−t_oldest;

, where t_oldest is the expected arrival time (or identified arrival time) of the oldest packet of a bundle of packets and t_current is the current time when scheduling is performed.

Next, still with reference to box 21, it is checked if the age Δt_0 of the oldest packet is smaller than or equal to the predefined packet delay budget (SPDB):

Is Δt_0<=SPDB?

If the age Δt_0 of the oldest packet is smaller than or equal to SPDB (box 24), then the age Δt_1 of the oldest packet at the next possible scheduling occasion is computed, box 25. The next possible scheduling occasion may for instance be the next DRX On Duration window if the UE is configured with a DRX cycle.

Δt_1=Δt_0+t_d

, where t_d is the time difference from the current time t_current to the next scheduling occasion, e.g. to the start of the next DRX On Duration window.

The DRX knowledge is thereby according to this embodiment introduced into the scheduler by using t_d. In other embodiments, other time restrictions that restrict the possible scheduling occasions are used instead or used in addition to DRX.

Scheduling packet delay budget (SPDB) is the delay budget that is used in order for the scheduling to fulfill the QoS requirement for a certain type of delay critical packets. The delay budget SPDB can be a parameter defined internally in a radio access node, e.g. evolved NodeB (eNB) for a scheduling of a packet in one wireless link direction link, that is, for uplink (from UE to eNB) or for downlink (from eNB to UE). A typical value may for instance be in the range 40 ms-50 ms. Such values are typically larger than the length of a DRX cycle.

If, at box 26, the age $\Delta t\_1$ at the next possible scheduling occasion is larger than the SPDB, i.e. if $\Delta t\_1 > SPDB$, then the age $\Delta t$ of the oldest packet is set equal to $\Delta t\_1$ and scheduling weight is computed by using $\Delta t\_1$ in the scheduling weight function and the oldest packet is scheduled and sent without bundling, as indicated in box 27.

If the age $\Delta t\_1$ of the oldest packet is smaller than or equal to the SPDB, i.e. if $\Delta t\_1 <= SPDB$, then the age $\Delta t$ of the oldest packet is instead set equal to $\Delta t\_0$, and scheduling weight for the packet bundle is computed according to the delay based weight function using $\Delta t\_0$ as indicated in box 28.

If in box 21 the age $\Delta t\_0$ of the oldest packet is larger than delay budget (box 22), then the scheduling weight is again (as in box 28) calculated for the packet bundle according to the delay based weight function using $\Delta t\_0$, as indicated in box 23.

The above exemplifying scheduling algorithm 20 for the case of delay based scheduling scheme can be summarized as follows:

Step 1: Compute the oldest packet age at the current time t_current:

$$\Delta t\_0 = t\_current - t\_oldest$$

Step 2: check if $\Delta t\_0$ is smaller than the predefined packet delay budget (SPDB)

Figure 4:
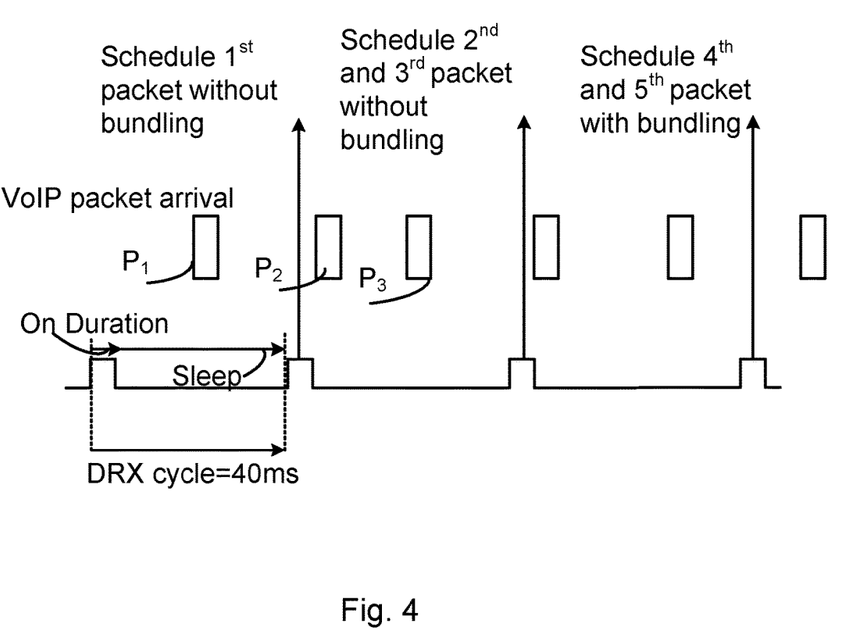
FIG. 4 illustrates a scheduling when implementing an embodiment of the present disclosure.

If $\Delta t\_0 <= SPDB$
  Compute the oldest packet age $\Delta t\_1$ at the next scheduling occasion based on knowledge about time restrictions for the UE, next scheduling occasion (at time t_d) for instance being the next DRX On Duration.
  $\Delta t\_1 = \Delta t\_0 + t\_d$
  If $\Delta t\_1 > SPDB$
    Set $\Delta t = \Delta t\_1$, and compute scheduling weight according to weight function using $\Delta t\_1$
  Else
    Set $\Delta t = \Delta t\_0$, and compute scheduling weight according to weight function using $\Delta t\_0$.
  End if
Else
  Set $\Delta t = \Delta t\_0$, compute scheduling weight according to weight function using $\Delta t\_0$.
End if FIG. 4 illustrates the scheduling behavior after introducing aspects of the present disclosure. In the figure, DRX is again used as an example on a time restriction that restricts the scheduling occasions for the UE to be scheduled. The DRX cycle may for instance be 40 ms and comprises an OnDuration period and a sleep period as indicated in the FIG. 3. A first VoIP packet $P_1$ arrives during the sleep period of the UE and if this first packet $P_1$ were to be bundled with a second packet $P_2$ then the next possible scheduling occasion, i.e. next OnDuration period of the DRX cycle, would be such that the delay budget would be exceeded and the QoS would hence not be fulfilled. According to the present disclosure, the first packet $P_1$ is therefore sent without bundling. The second packet $P_2$ and a third packet $P_3$ can be sent bundled without violating the delay budget, as can a fourth packet and a fifth packet.

Figure 5:
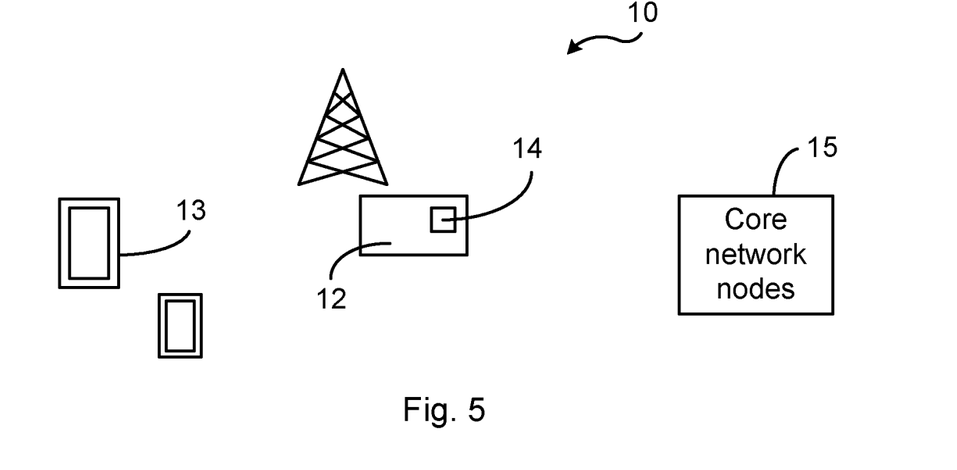
FIG. 5 illustrates schematically an environment in which embodiments of the present disclosure may be implemented.

FIG. 5 illustrates schematically an environment in which embodiments of the present disclosure may be implemented. A wireless network 10 comprises a number of radio access nodes 12 providing wireless communication links for communication devices 13. Such network nodes 12 may be denoted in different ways, e.g. radio access node, base station, radio base station, evolved node B (eNB) etc. The communication devices 13 may also be denoted in different ways, e.g. mobile station, wireless device, user equipment (UE), etc. The communication device 13 is in the following denoted UE, and may for instance comprise a smart phone, a tablet etc.

The wireless network 10 typically comprises various other network nodes, such as Mobility Management Entity (MME), or operation and maintenance (OM) nodes, packet data network gateways, mobility management entities, serving gateways etc. Such other network nodes are collectively and schematically illustrated at reference numeral 15 as Core network nodes.

The radio access node 12 may comprise a scheduler 14 for scheduling radio resources to the UEs 13 residing within its one or more coverage areas (also denoted cell(s)). The various embodiments of the scheduling algorithm according to the present disclosure may be implemented in such scheduler 14. However, it is noted that the scheduler 14 may be a standalone node, not integrated with the radio access node 12.

Figure 6:
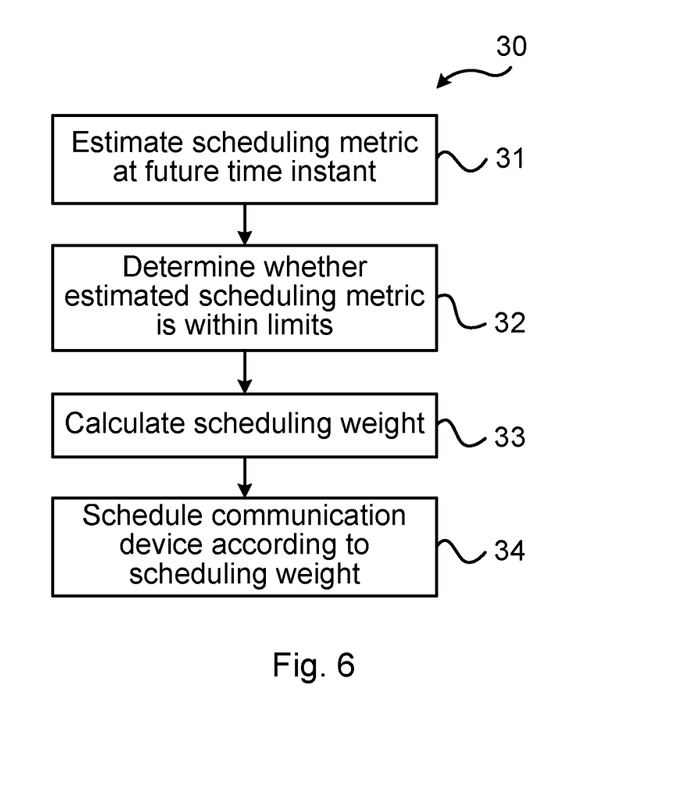
FIG. 6 illustrates a flow chart over steps of a method in a network element, in particular a scheduler, in accordance with an embodiment of the present disclosure.

FIG. 6 illustrates a flow chart over steps of a method in a network element, comprising for instance a scheduler, in accordance with an embodiment of the present disclosure.

A method 30 is provided that may be performed in a network element 14 for scheduling a communication device 13 of a wireless network 10. The network element 14 may for instance comprise a scheduler of a radio access node 12 or be a standalone node. The method 30 comprises estimating 31 a scheduling metric of a first arrived packet at a future time instant t, taking into account time domain restrictions for the communication device 13 that restricts a future scheduling occasion. The scheduling metric may for instance be delay or bit rate.

The method 30 comprises determining 32 whether the estimated scheduling metric at the future time instant t is within limits of the scheduling metric. The limits of the scheduling metric may for instance be a delay budget or a minimum bit rate.

The method 30 comprises calculating 33, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling.

The method 30 comprises scheduling 34 the communication device 13 according to determined scheduling weight.

The method 30 is applicable to different scheduling schemes, for instance to delay based scheduling or to proportional fair scheduling with minimum guaranteed bit rate. The method 30 may thus predict the possibility of transmission of a packet bundle with maintained quality of service at a future transmit time based on knowledge of any time domain restrictions that might be introduced by different features such as for instance DRX or eICIC. Depending on the predicted packet delay at the future instant, the packet might be transmitted without bundling. This reduces the packet losses, in particular for delay based scheduling schemes, but also for other scheduling schemes.

In an embodiment, the limits of the scheduling metric comprise limits for meeting a quality of service of a traffic stream to which the first arrived packet belongs.

In an embodiment, the scheduling metric comprises a packet delay or a bit rate.

In different embodiments, the limits of the scheduling metric comprise a packet delay budget or a minimum bit rate.

In an embodiment, using delay based scheduling:
the estimating 31 comprises estimating a first age, $\Delta t\_0$, of a first arrived packet, wherein the first age, $\Delta t\_0$, comprises the time difference between an arrival time of the first arrived packet and a current time t_current,
the determining 32 comprises determining whether the estimated first age, $\Delta t\_0$ is within a packet delay budget.

In a variation of the above embodiment:
the determining 32 further comprises determining a second age $\Delta t\_1$ for the first arrived packet in case the calculated first age $\Delta t\_0$ is smaller than or equal to the delay budget, wherein the second age $\Delta t\_1$ comprises the sum of the first age $\Delta t\_0$ and the time period, t_d, from the current time, t_current, to a next possible scheduling occasion for the communication device 13, the next possible scheduling occasion taking into consideration the obtained time domain restrictions, and
the calculating 33 comprises calculating a scheduling weight for the first arrived packet if the second age $\Delta t\_1$ is larger than the delay budget and calculating a scheduling weight for the packet bundle if the second age $\Delta t\_1$ is smaller than or equal to the delay budget.

In another variation of the above embodiment the determining 32 comprises determining that the first age, $\Delta t\_0$, is larger than the packet delay budget and the calculating 33 comprises calculating a scheduling weight for the packet bundle comprising the first arrived packet and at least one more packet, for transmission of the packet bundle.

In an embodiment, the time domain restrictions for the communication device 13 comprises one or more of: configuration of discontinuous reception mode for the communication device 13, information about Almost Blank Subframe and information on enhanced Inter-Cell Interference Coordination schemes.

In an embodiment, the method 30 comprises, prior to the estimating 31 a scheduling metric, establishing that the packet comprises a delay critical packet.

Figure 7:
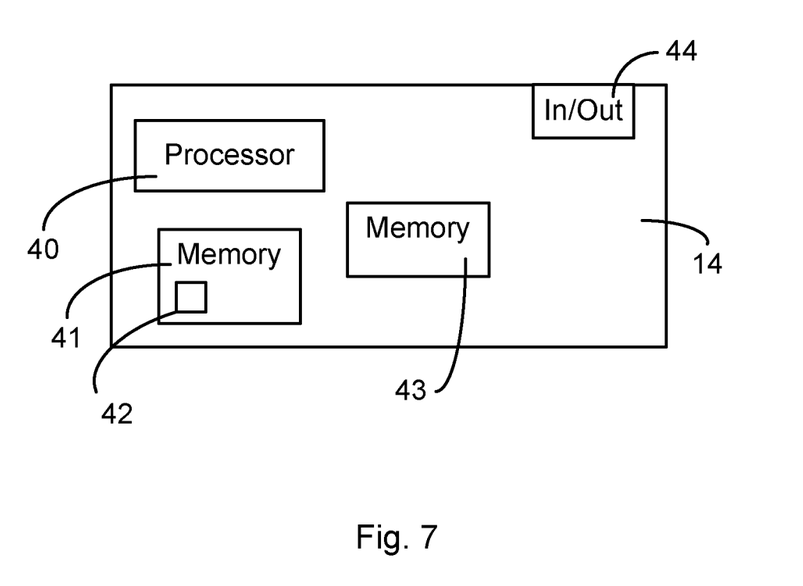
FIG. 7 illustrates schematically a network element and means for implementing embodiments of the method of the present disclosure.

FIG. 7 illustrates schematically a network element and means for implementing embodiments of the method of the present disclosure. The network element 14 may comprise a scheduler 14, in particular a packet scheduler, of a radio access node 12. The network element 14 comprises an input/output device 44 for communicating with other entities e.g. of the radio access node 12. The input/output device 44 may comprise an interface for receiving various input data for use in a scheduling decision and for outputting a scheduling decision. The network element 14 may e.g. use the input/output device 44 for outputting scheduling information to transceiver circuitry of the radio access node 12, such transceiver circuitry (and e.g. antenna devices) providing the UE 13 with information about uplink scheduled resources and also transmitting the packets using downlink scheduled resources.

The network element 14 comprises a processor 40 comprising any combination of one or more of a central processing unit (CPU), multiprocessor, microcontroller, digital signal processor (DSP), application specific integrated circuit etc. capable of executing software instructions stored in a memory 41, which can thus be a computer program product 41. The processor 40 can be configured to execute any of the various embodiments of the method as described for instance in relation to FIG. 7.

In particular, a network element 14 is provided for scheduling a communication device 13 in a wireless network 10. The network element 14 is configured to:
estimate a scheduling metric of a first arrived packet at a future time instant t, taking into account time domain restrictions for the communication device (13) that restricts a future scheduling occasion,
determine whether the estimated scheduling metric at the future time instant t is within limits of the scheduling metric,
calculate, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling, and
schedule the communication device (13) according to determined scheduling weight.

The network element 14 may for instance be configured to perform the various steps by comprising a processor 40 and memory 41, the memory 41 containing instructions executable by the processor 40, whereby the network element 14 is operative to perform the various steps.

In an embodiment, the limits of the scheduling metric comprises limits for meeting a quality of service of a traffic stream to which the first arrived packet belongs.

In different embodiments, the scheduling metric comprises a packet delay or a bit rate.

In an embodiment, the limits of the scheduling metric comprise a packet delay budget or a minimum bit rate.

In an embodiment, the network element is configured to:
estimate by estimating a first age, $\Delta t\_0$, of a first arrived packet, wherein the first age, $\Delta t\_0$, comprises the time difference between an arrival time of the first arrived packet and a current time t_current,
determine by determining whether the estimated first age, $\Delta t\_0$ is within a packet delay budget.

In a variation of the above embodiment, the network element is configured to:
determine further by determining a second age $\Delta t\_1$ for the first arrived packet in case the calculated first age $\Delta t\_0$ is smaller than or equal to the delay budget, wherein the second age $\Delta t\_1$ comprises the sum of the first age $\Delta t\_0$ and the time period, t_d, from the current time, t_current, to a next possible scheduling occasion for the communication device 13, the next possible scheduling occasion taking into consideration the obtained time domain restrictions, and
calculate by calculating a scheduling weight for the first arrived packet if the second age $\Delta t\_1$ is larger than the delay budget and calculating a scheduling weight for the packet bundle if the second age $\Delta t\_1$ is smaller than or equal to the delay budget.

In another variation of the above embodiment, the network element is configured to determine by determining that the first age, $\Delta t\_0$, is larger than the packet delay budget and configured to calculate by calculating a scheduling weight for the packet bundle comprising the first arrived packet and at least one more packet, for transmission of the packet bundle.

In an embodiment, the time domain restrictions for the communication device 13 comprises one or more of: configuration of discontinuous reception mode for the communication device 13, information about Almost Blank Subframe and information on enhanced Inter-Cell Interference Coordination schemes.

In an embodiment, the network element is configured to, prior to the estimating a scheduling metric, establish that the packet comprises a delay critical packet.

Still with reference to FIG. 7, the memory 41 can be any combination of random access memory (RAM) and read only memory (ROM), Flash memory, magnetic tape, Compact Disc (CD)-ROM, digital versatile disc (DVD), Blueray disc etc. The memory 41 may also comprise persistent storage, which, for example, can be any single one or combination of magnetic memory, optical memory, solid state memory or even remotely mounted memory.

A data memory 43 may also be provided for reading and/or storing data during execution of software instructions in the processor 40. The data memory 43 may for instance be any combination of read and write memory (RAM) and read only memory (ROM).

The present disclosure also encompasses computer program 42 comprising computer program code for causing a network element 14 to perform the method for instance as described in relation to FIG. 6, when the computer program code is executed on a processor 40 of the network element 14.

The present disclosure also encompasses a computer program product 41 as above, and a computer readable means on which the computer program 42 is stored.

Figure 8:
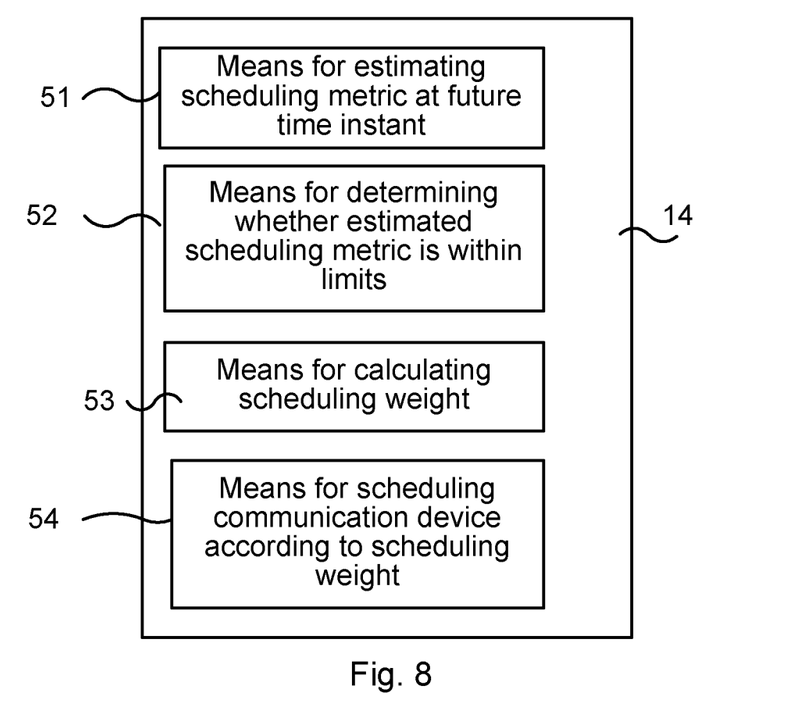
FIG. 8 illustrates a network node comprising function modules/software modules for implementing methods of the present disclosure.

An example of an implementation using function modules/software modules is illustrated in FIG. 8, in particular illustrating a network element 14 comprising function modules and/or software modules for implementing embodiments of the method 30. The network element 14 comprises first means 51 for estimating a scheduling metric of a first arrived packet at a future time instant t, taking into account time domain restrictions for the communication device 13 that restricts a future scheduling occasion. Such means may for example comprise processing circuitry adapted to perform this estimating by using program code stored in a memory.

The network element 14 may comprise second means 52 for determining whether the estimated scheduling metric at the future time instant t is within limits of the scheduling metric. Such means may for example comprise processing circuitry adapted to perform this determining by using program code stored in a memory.

The network element 14 may comprise third means 53 for calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling. Such means may for example comprise processing circuitry adapted to perform this calculating by using program code stored in a memory.

The network element 14 may comprise fourth means 54 for scheduling the communication device 13 according to determined scheduling weight. Such means may for example comprise processing circuitry adapted to perform this scheduling by using program code stored in a memory.

The network element 14 may comprise yet additional means (not illustrated in the FIG. 8), for carrying out any of the steps of the various embodiments of the method 30.

The function modules 51, 52, 53, 54 may be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a radio access network element for scheduling a mobile communication device of a wireless network, the method comprising:
   receiving a first arrived packet from a core network element of the wireless network;
   estimating a scheduling metric for delivering the first arrived packet at a future time instant to the mobile communication device based on a time domain restriction of an active communication period for the mobile communication device that restricts future scheduling of the delivery of the first arrived packet to the mobile communication device to the active communication period;
   determining whether the estimated scheduling metric at the future time instant is within limits of the scheduling metric;
   calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and
   scheduling transmission of the first arrived packet to the mobile communication device according to calculated scheduling weight.

2. The method as claimed in claim 1, wherein the limits of the scheduling metric comprise limits for meeting a quality of service of a traffic stream to which the first arrived packet belongs.

3. The method as claimed in claim 1, wherein the scheduling metric comprises a packet delay or a bit rate.

4. The method as claimed in claim 1, wherein the limits of the scheduling metric comprise a packet delay budget or a minimum bit rate.

5. The method as claimed in claim 1, wherein:
   the estimating comprises estimating a first age of the first arrived packet, wherein the first age, comprises the time difference between an arrival time of the first arrived packet and a current time; and
   the determining comprises determining whether the estimated first age is within a packet delay budget.

6. The method as claimed in claim 5, wherein:
   the determining further comprises determining a second age for the first arrived packet in case the calculated first age is smaller than or equal to the delay budget, wherein the second age comprises the sum of the first age and the time from the current time to a next possible scheduling occasion for the communication device, the next possible scheduling occasion taking into consideration the obtained time domain restrictions; and the calculating comprises calculating a scheduling weight for the first arrived packet if the second age is larger than the delay budget and calculating a scheduling weight for the packet bundle if the second age is smaller than or equal to the delay budget.

7. The method as claimed in claim 5, wherein the determining comprises determining that the first age is larger than the packet delay budget, and the calculating comprises calculating a scheduling weight for the packet bundle comprising the first arrived packet and at least one more packet, for transmission of the packet bundle.

8. The method as claimed in claim 1, wherein the time domain restrictions for the communication device comprise one or more of configuration of discontinuous reception mode for the communication device, information about Almost Blank Subframe or information on enhanced Inter-Cell Interference Coordination schemes.

9. The method as claimed in claim 1, comprising, prior to the estimating a scheduling metric, establishing that the packet comprises a delay critical packet.

10. A radio access network element for scheduling a mobile communication device in a wireless network, the network element comprising a processor and a memory, the processor configured to access instructions stored in the memory to cause the processor to perform operations comprising:
  receiving a first arrived packet from a core network element of the wireless network;
  estimating a scheduling metric for delivering the first arrived packet at a future time instant to the mobile communication device based on a time domain restriction of an active communication period for the mobile communication device that restricts future scheduling of the delivery of the first arrived packet to the mobile communication device to the active communication period;
  determining whether the estimated scheduling metric at the future time instant is within limits of the scheduling metric;
  calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and
  scheduling transmission of the first arrived packet to the mobile communication device according to calculated scheduling weight.

11. The network element as claimed in claim 10, wherein the limits of the scheduling metric comprise limits for meeting a quality of service of a traffic stream to which the first arrived packet belongs.

12. The network element as claimed in claim 10, wherein the scheduling metric comprises a packet delay or a bit rate.

13. The network element as claimed in claim 10, wherein the limits of the scheduling metric comprise a packet delay budget or a minimum bit rate.

14. The network element as claimed in claim 10:
  wherein the estimating further comprises estimating a first age of a first arrived packet, wherein the first age comprises the time difference between an arrival time of the first arrived packet and a current time; and
  wherein the determining further comprises determining whether the estimated first age is within a packet delay budget.

15. The network element as claimed in claim 14, wherein:
  the determining further comprises determining a second age for the first arrived packet in case the calculated first age is smaller than or equal to the delay budget, wherein the second age comprises the sum of the first age and the time period from the current time to a next possible scheduling occasion for the communication device, the next possible scheduling occasion taking into consideration the obtained time domain restrictions; and
  the calculating further comprises calculating a scheduling weight for the first arrived packet if the second age is larger than the delay budget and calculating a scheduling weight for the packet bundle if the second age is smaller than or equal to the delay budget.

16. The network element as claimed in claim 14, wherein the determining comprises determining that the first age is larger than the packet delay budget and configured to calculate by calculating a scheduling weight for the packet bundle comprising the first arrived packet and at least one more packet, for transmission of the packet bundle.

17. The network element as claimed in claim 10, wherein the time domain restrictions for the communication device comprise one or more of configuration of discontinuous reception mode for the communication device, information about Almost Blank Subframe or information on enhanced Inter-Cell Interference Coordination schemes.

18. The network element as claimed in claim 10, wherein the operations further comprise, prior to the estimating a scheduling metric, establishing that the packet comprises a delay critical packet.

19. A computer program product for a network element for scheduling a communication device, the computer program product comprising a non-transitory computer readable storage medium storing computer program code, which, when executed on the processor of the network element causes the network element to perform operations comprising:
  receiving a first arrived packet from a core network element of the wireless network;
  estimating a scheduling metric for delivering the first arrived packet at a future time instant to the mobile communication device based on a time domain restriction of an active communication period for the mobile communication device that restricts future scheduling of the delivery of the first arrived packet to the mobile communication device to the active communication period;
  determining whether the estimated scheduling metric at the future time instant is within limits of the scheduling metric;
  calculating, for the case the estimated scheduling metric is within limits of the scheduling metric, a scheduling weight for a packet bundle comprising the first arrived packet and at least one more packet, and else calculating a scheduling weight for the first arrived packet for transmission of the first arrived packet without bundling; and
  scheduling transmission of the first arrived packet to the mobile communication device according to calculated scheduling weight.

* * * * *